US009298686B2

(12) United States Patent
Ratkowski et al.

(10) Patent No.: US 9,298,686 B2
(45) Date of Patent: Mar. 29, 2016

(54) SYSTEM AND METHOD FOR SIMULATING DISCRETE FINANCIAL FORECAST CALCULATIONS

(75) Inventors: Richard R. Ratkowski, St. Peters, MO (US); Sreedhar Peddineni, Hyderabad (IN); Ganesh Sripadi, Hyderabad (IN); Tata Venkata Ranga Nageswara Rao, Hyderabad (IN)

(73) Assignee: GOLUB CAPITAL, LLC, Chicago, IL (US)

( * ) Notice: Subject to any disclaimer, the term of this patent is extended or adjusted under 35 U.S.C. 154(b) by 1130 days.

(21) Appl. No.: 12/466,307

(22) Filed: May 14, 2009

(65) Prior Publication Data

US 2010/0293450 A1    Nov. 18, 2010

(51) Int. Cl.
*G06F 17/00* (2006.01)
*G06F 17/24* (2006.01)
*G06Q 40/00* (2012.01)

(52) U.S. Cl.
CPC .............. *G06F 17/246* (2013.01); *G06Q 40/00* (2013.01)

(58) Field of Classification Search
CPC .................................................... G06F 17/246
USPC ................... 715/212, 214, 217, 219
See application file for complete search history.

(56) References Cited

U.S. PATENT DOCUMENTS

| | | | | |
|---|---|---|---|---|
| 8,234,569 | B2 * | 7/2012 | Penner | 715/255 |
| 2004/0088650 | A1 * | 5/2004 | Killen et al. | 715/503 |
| 2004/0172592 | A1 * | 9/2004 | Collie et al. | 715/503 |
| 2005/0187969 | A1 * | 8/2005 | Chaudri | 707/103 R |
| 2005/0267868 | A1 * | 12/2005 | Liebl et al. | 707/2 |
| 2005/0268215 | A1 * | 12/2005 | Battagin et al. | 715/503 |
| 2006/0015805 | A1 * | 1/2006 | Humenansky et al. | 715/503 |
| 2006/0271322 | A1 * | 11/2006 | Haggerty | 702/108 |
| 2007/0061698 | A1 * | 3/2007 | Megiddo et al. | 715/503 |
| 2007/0203935 | A1 * | 8/2007 | de Souza | 707/102 |
| 2007/0219956 | A1 * | 9/2007 | Milton | 707/3 |
| 2007/0250764 | A1 * | 10/2007 | Jiang | 715/503 |
| 2008/0208666 | A1 * | 8/2008 | Dong et al. | 705/8 |
| 2008/0243763 | A1 * | 10/2008 | Bishop et al. | 707/2 |

OTHER PUBLICATIONS

MSDN Library, Shared (Visual Basic), Nov. 2, 2008, Microsoft MSDN, pp. 1-3 Retrieved:https://web.archive.org/web/20081102170557/http://msdn.microsoft.com/en-us/library/zc2b427x.aspx.*

* cited by examiner

*Primary Examiner* — Scott Baderman
*Assistant Examiner* — Howard Cortes
(74) *Attorney, Agent, or Firm* — Armstrong Teasdale LLP (57) ABSTRACT

A method is provided for creating a simulated spreadsheet. The method includes receiving information from a simulated spreadsheet template, separating the simulated spreadsheet template from information within the simulated spreadsheet template, storing the simulated spreadsheet template and the corresponding information separately, calculating any calculable information within the information by using spreadsheet formula syntax, and presenting a simulated spreadsheet that includes the calculated information.

10 Claims, 10 Drawing Sheets

SYSTEM AND METHOD FOR SIMULATING DISCRETE FINANCIAL FORECAST CALCULATIONS

BACKGROUND

Spreadsheets are very flexible and provide a user with an ability to model many different types of calculations with user defined formulas. Spreadsheets are widely accepted as a financial planning tool and have become a financial language utilizing a cryptic row/column/operator structure that has evolved to be its own standard. For example, a majority of users/companies use EXCEL (EXCEL is a registered trademark of the Microsoft Corporation) spreadsheets for financial budgeting and forecasting. Spreadsheets allow a user to model many different types of calculations, and therefore financial forecasts may be based on discrete formulas and drivers contained in a spreadsheet. However, as a company continues to grow in size, spreadsheets that contain the company's financial budgets and forecasts also continue to grow in size and it is not uncommon for larger companies to have spreadsheet files exceeding 100 megabytes in size.

In addition to large spreadsheet files, a company may have countless individual spreadsheets that are linked together to manage a financial model. Currently, to manage a financial model with linked spreadsheets, each individual linked spreadsheet is dependent on specific coordinates that are shared by other applicable linked spreadsheets with respect to, for example, terms, rows, columns, and tabs within a spreadsheet. However, as changes are made to each individual spreadsheet regarding, for example, terms, rows, columns, and tabs, these changes should be updated in each applicable linked spreadsheet as well, otherwise cell errors occur.

In addition, because spreadsheets are a personal productivity tool that are not meant to model an entire organization, several problems exist when managing a financial model with multiple linked spreadsheets as described above. For example: 1) spreadsheets only provide a two dimensional representation of "n" dimensional financial and operational modeling space ("n" dimensional space represented by customers, products, sales channels, accounts, departments, and the like); 2) a spreadsheet model made up of multiple linked spreadsheets requires a user/modeler to open, calculate, and save each spreadsheet when a driver is changed; 3) a spreadsheet only allows a presentation of data and an input of data in two dimensions; 4) a spreadsheet is unique to a developer of the spreadsheet; and 5) spreadsheets that are configured to solve a same problem may look totally different.

SUMMARY

In one aspect, a method is provided for creating a simulated spreadsheet. The method includes receiving information from a simulated spreadsheet template, separating the simulated spreadsheet template from information within the simulated spreadsheet template, storing the simulated spreadsheet template and the corresponding information separately, calculating any calculable information within the information by using spreadsheet formula syntax, and presenting a simulated spreadsheet that includes the calculated information.

In another aspect, a system for creating a simulated spreadsheet is provided. The system includes a database, a display device, and a computing device. The computing device includes a processor programmed to receive information from a simulated spreadsheet template, separate the simulated spreadsheet template from information within the simulated spreadsheet template, store the simulated spreadsheet template and the corresponding information separately in the database, calculate any calculable information within the information by using spreadsheet formula syntax, and present a simulated spreadsheet that includes the calculated information to a user via the display device.

In yet another aspect, one or more computer-readable media having computer-executable components is provided. The components include a receiving component for receiving information from a simulated spreadsheet template, a separating component for separating a simulated spreadsheet from information within the simulated spreadsheet template, a storing component for storing the simulated spreadsheet template and the corresponding information separately in the database, a calculating component for calculating any calculable information within the information by using spreadsheet formula syntax, and a presentation component for presenting a simulated spreadsheet that includes the calculated information to a user via a display device.

BRIEF DESCRIPTION OF THE DRAWINGS

Corresponding reference characters indicate corresponding parts throughout the drawings.

DETAILED DESCRIPTION

Figure 8:
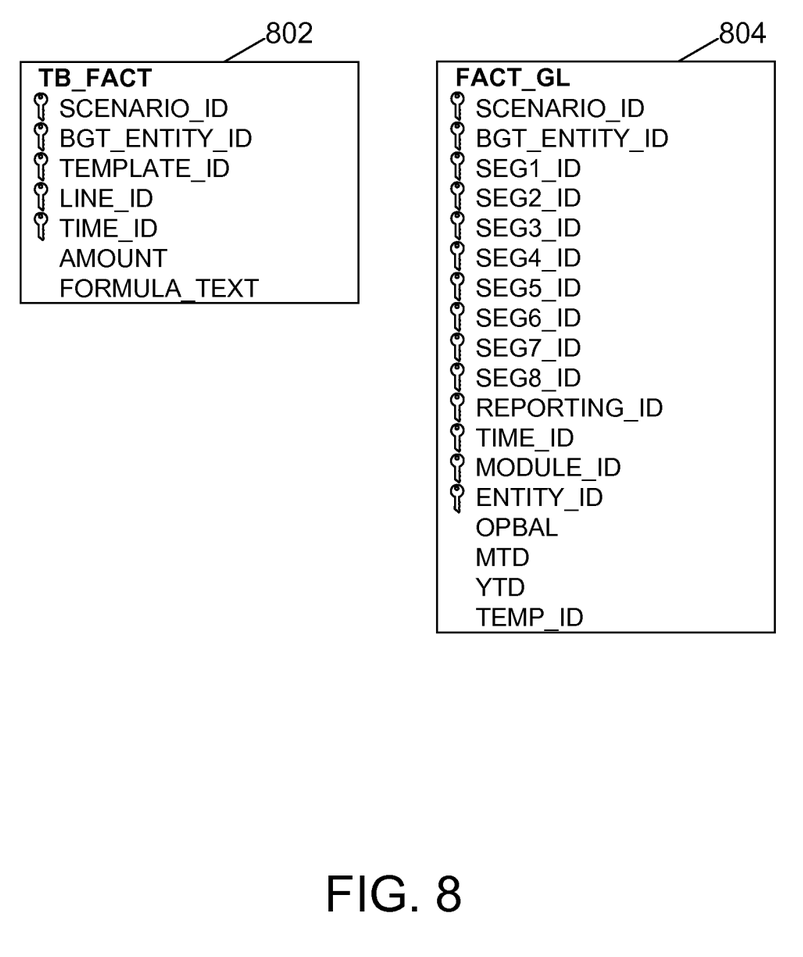
FIG. 8 is an exemplary diagram of a database for storing and retrieving input and output model values and user defined calculations for a simulated spreadsheet.

Discrete financial and operational modeling systems and methods are described herein for simulating financial and operational calculations typically found when forecasting future results based on, for example, past history, recipe formulas, business assumptions, units, rates, amounts, and other drivers and outputs that result using standard financial and operational reports. Embodiments of the invention generally include a visual format common to EXCEL and other spreadsheet software applications as shown in FIG. 8, as well as common spreadsheet formula syntax for defining discrete calculations of a model. However, unlike EXCEL and other spreadsheet software, a simulated spreadsheet described herein does not exist as a standard spreadsheet file, and in contrast, is presented within a Web Browser. In addition, embodiments of the invention provide separate inputs for defining drivers and variables used by a model, outputs of calculations formatted in a fact file format, and control sequences processed based on a multi-dimensional system.

Figure 1:
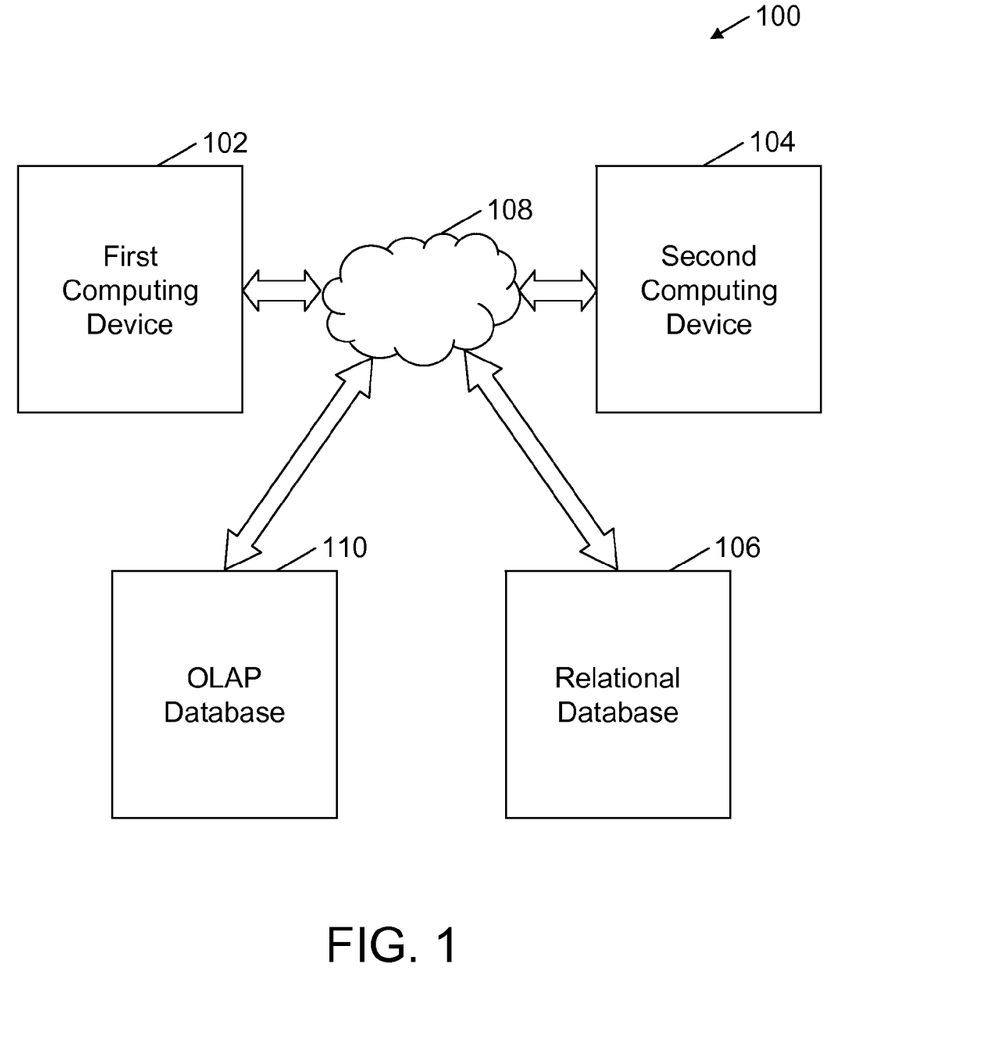
FIG. 1 is an exemplary block diagram illustrating an operating environment suitable for use in implementing embodiments of the invention.

With reference now to FIG. 1, a system 100 includes a first computing device 102, a second computing device 104, a relational database 106, a network 108, and an online analytical processor (OLAP) database 110. System 100 is configured to simulate, leverage, and/or present information, for example, financial forecast information, to a user in a spreadsheet format within a Web Browser. In an embodiment, a first computing device 102 accesses one or more databases, such as relational database 106 and online OLAP database 110 through network 108 for information necessary to present a simulated spreadsheet. However, while the present disclosure described herein is directed toward embodiments that utilize first computing device 102, second computing device 104, network 108, relational database 106, and/or OLAP database 110 to create, leverage, and/or present information in a simulated spreadsheet, other embodiments are well within the scope of the present disclosure. For example, first computing device 102 may include a database 206 (see FIG. 2), which corresponds to and replaces relational database 106.

Figure 2:
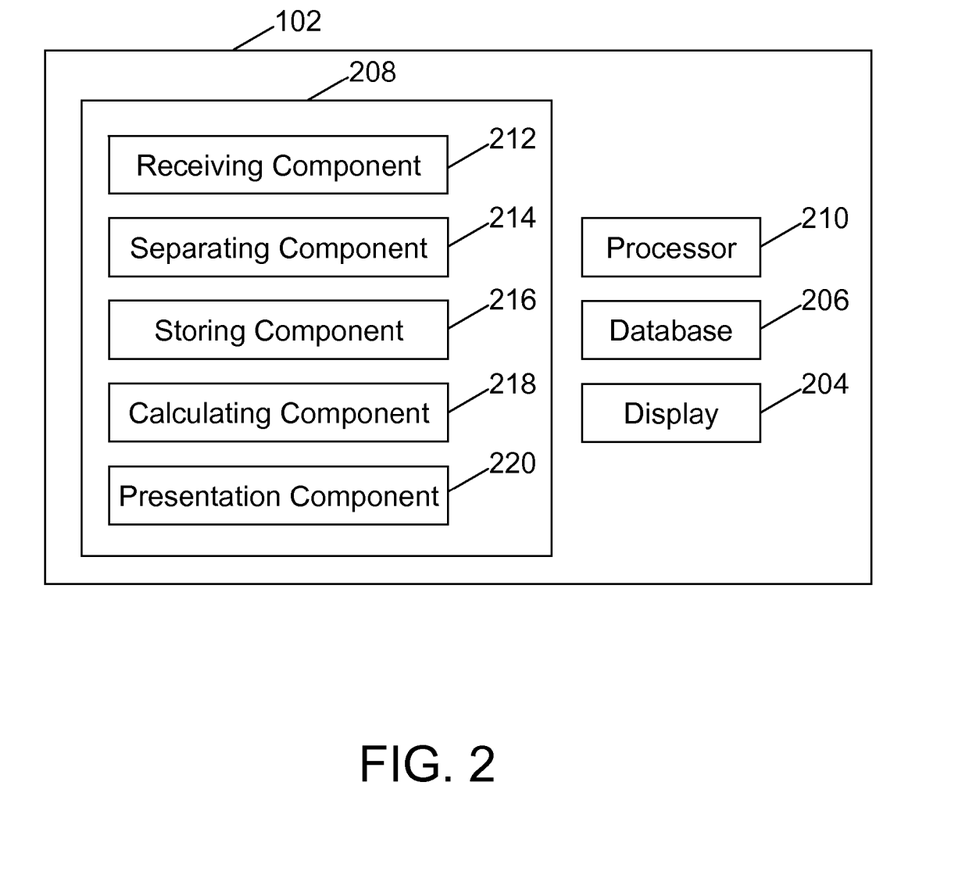
FIG. 2 is an exemplary block diagram of a computing device having a memory area storing components for simulating financial forecasts.

Referring next to FIG. 2, an exemplary block diagram of a computing device having a memory area storing components for simulating financial forecasts is shown. The diagram of FIG. 2 is merely illustrative of an exemplary computing device that may be used in connection with one or more embodiments of the disclosure, and is not intended to be limiting in any way. In an embodiment, first computing device 102 includes a display 204, a database 206, a memory area 208, and at least one processor 210. Display 204 may be, for example, a display device separate from first computing device 102, a display integrated into first computing device 102 (e.g., such as in a mobile telephone), a capacitive touch screen display, or a non-capacitive display. User input functionality may also be provided in display 204, wherein display 204 acts as a user input selection device such as in a touch screen.

In an embodiment, processor 210 is transformed into a special purpose microprocessor by executing computer-executable instructions or by otherwise being programmed. For example, the processor 210 is programmed with instructions such as illustrated in FIG. 3 to create and present a simulated spreadsheet to a user.

Memory area 208 stores one or more computer-executable components. Exemplary components include, but are not limited to receiving component 212, separating component 214, storing component 216, calculating component 218, and presentation component 220. While the components are shown to be stored in the memory area 208, the components may be stored and executed from a memory area remote from first computing device 102, for example, in second computing device 104 (e.g., a server) or by a cloud service, and the output of the execution of the components may be provided to first computing device 102. Such embodiments reduce the computational and storage burden on first computing device 102.

Figure 3:
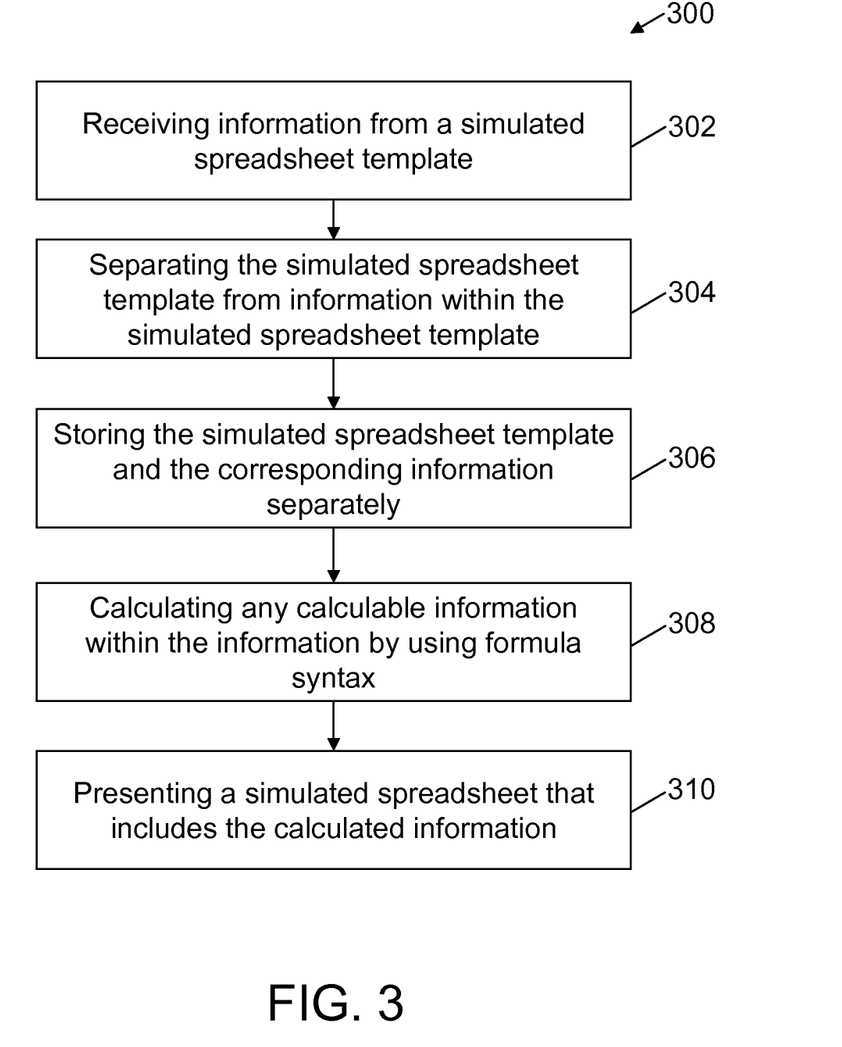
FIG. 3 is an exemplary flow chart illustrating the execution of a financial forecast simulation.
Figure 4:
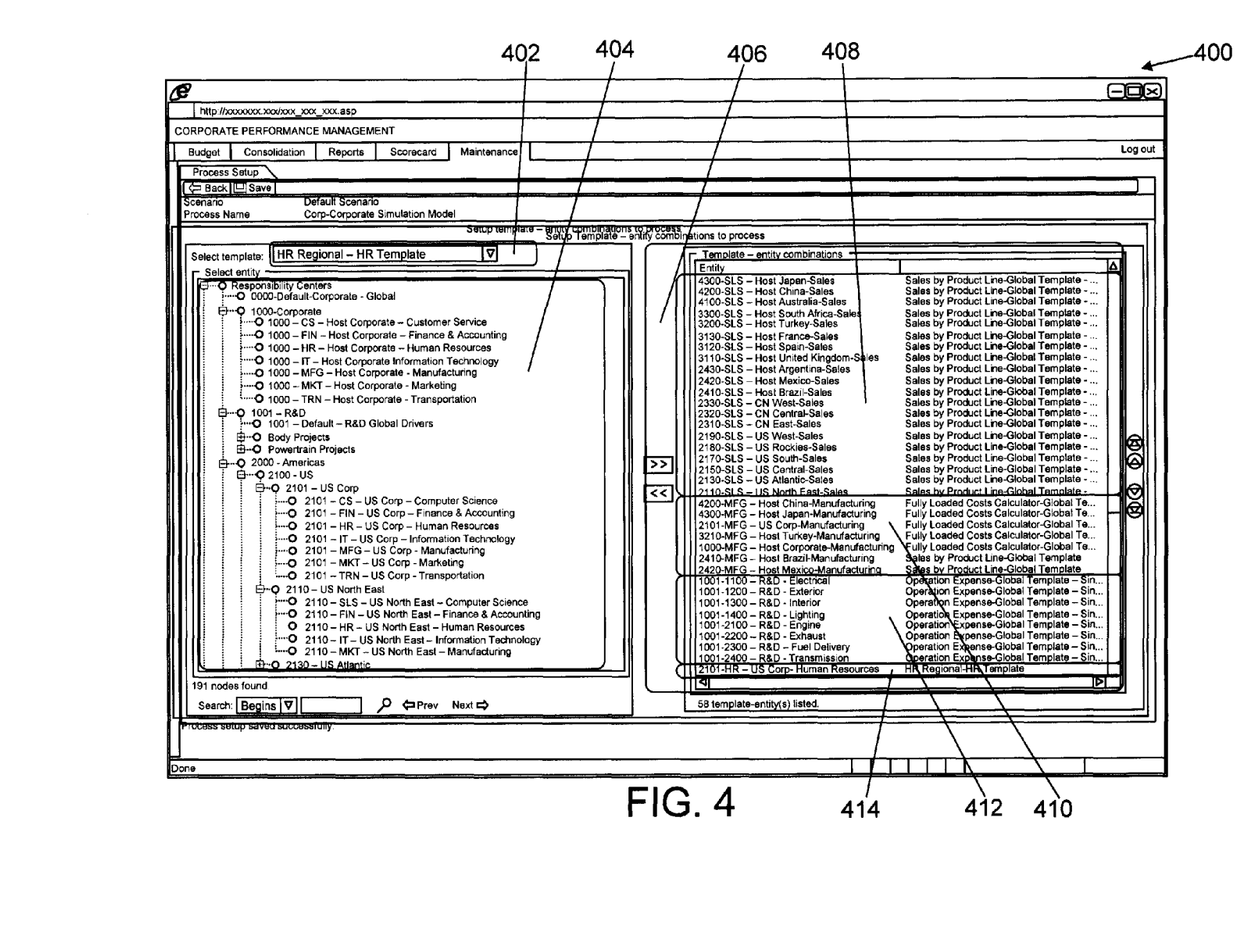
FIG. 4 is an exemplary user interface for selecting a simulated spreadsheet template, a budget entity from a control dimension, and a processing sequence of a financial model.
Figure 5:
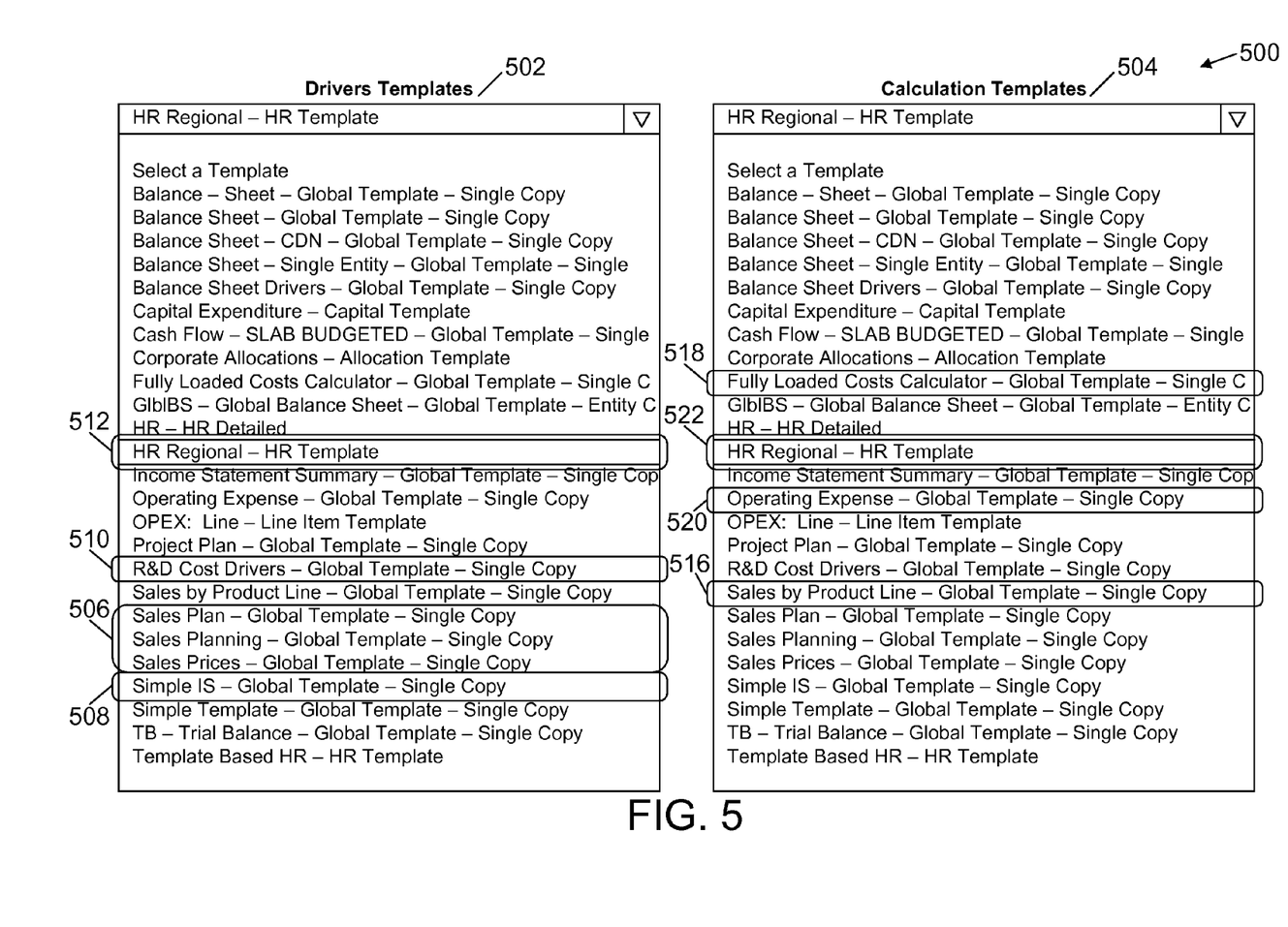
FIG. 5 is an exemplary user interface that provides available simulated spreadsheet templates.

With reference now to FIG. 3, an exemplary method 300 illustrating the execution of a financial forecast simulation will now be described with reference to FIG. 2. At 302, information from a simulated spreadsheet template is received, for example, via receiving component 212. The information received may be at least one of: a simulated spreadsheet template selected by a user and/or a calculation template that includes data, formulas, report formats and the like to be included within a simulated spreadsheet template. For example, with reference now to FIG. 4, an exemplary user interface 400 for selecting a simulated spreadsheet template, a budget entity from a control dimension, and a processing sequence of a financial model is shown. At 402, a user may select a simulated spreadsheet template, for example, via a drop down box. As shown in FIG. 5, an exemplary user interface 500 provides drop down boxes 502 and 504 that include available simulated spreadsheet templates. For example, drown box 502 provides a list of driver templates used for entering business drivers and drop down box 504 provides a list of calculation templates that take a driver template's values and processes them using discrete formulas based on standard spreadsheet syntax, such as EXCEL syntax. For example, group 506 defines sales groups within a corporation that is processed against template 516 ("Sales by product line" template). Group 508 defines manufacturing entities within a corporation that is processed against template 518 ("Fully Loaded Cost Calculator" template). Group 510 defines research and development departments that is processed against template 520 ("Operating Expense" template"). Group 512 defines human resources departments that is processed against template 522 ("HR Regional" template).

With reference back to FIG. 4, at 404, a user may select a budget entity that is a combination of a single member from multiple dimensions. At 406, a processing sequence is created/shown that includes reference numbers 408, 410, 412, and 414 that identifies inputs and calculation templates used for budget entities. In an embodiment, a group of multi-dimensional members may be identified to process received data against, for example, a model control dimension. In a further embodiment, each member of a model control dimension includes at least one member from each dimension identified to be part of the model control dimension. In yet another embodiment, a processing sequence, including a series of model sets, is also processed. Each model set includes an identification of an assigned model calculation and/or an assigned member from the model control dimension. A process sequence may include, for example, a sequence number, an assignment of multi-dimensional members from a model control dimension, and an assignment of a model set.

Figure 7:
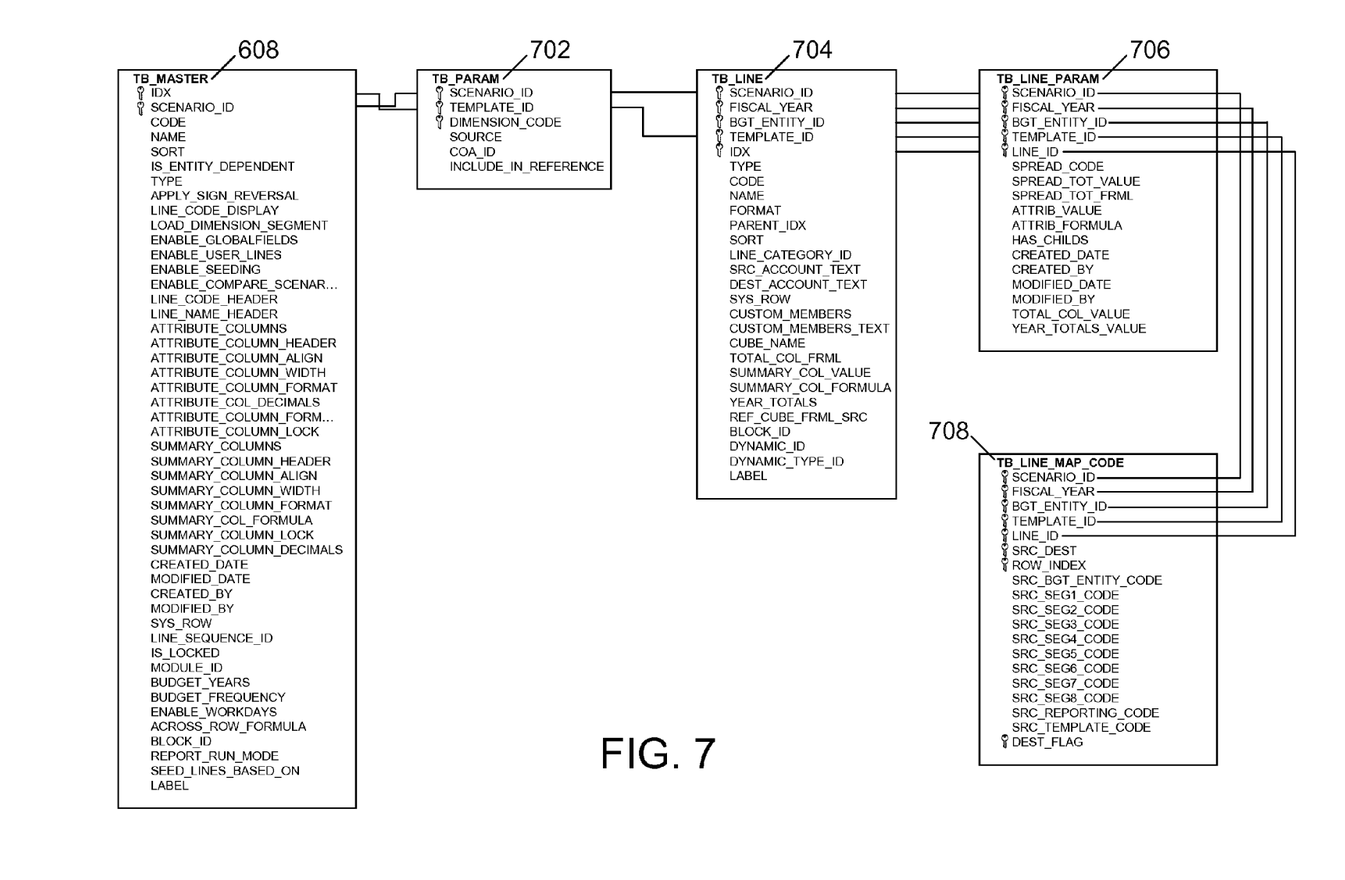
FIG. 7 is an exemplary diagram of a database for storing and retrieving model calculations.

With reference back to FIG. 3, at 304, the simulated spreadsheet template is separated from information within the simulated spreadsheet template, for example, via separating component 214. At 306, the separated simulated spreadsheet template and the corresponding information are stored in a relational database, for example, via storing component 216. In an embodiment, the separated information is stored in a fact table file format in a relational database (as shown in FIG. 7), wherein a design of the fact table file format is to recreate a simulated spreadsheet. At 308, any calculable information within the separated information is calculated, for example, via calculating component 218. In an embodiment, calculating component 218 calculates any calculable information within the information using, for example, predetermined spreadsheet formula syntax. As mentioned above, although the systems and methods described herein provide a user interface that provides a visual format common to EXCEL and other spreadsheet software applications in a Web Browser, formulas for calculating information are consistent with formula syntax found in spreadsheets such as, EXCEL. In an embodiment, the fact table is accessed for driver values and calculation models to create "Excel like" calculations in memory without a need for a user interface. After the calculations are processed utilizing any values or formulas from the relational database that are applicable, the calculated values are stored in the relational database.

In an embodiment, a simulation model is calculated/executed by selecting a first model set in a sequence, retrieving a model calculation assigned to that model set, retrieving all of input data used by the model calculation based on assigned members from a model control dimension, and calculating all cells in the model calculation. In a further embodiment, a processing dimension (e.g., values within simulated spreadsheet) that are independent of OLAP hierarchies is leveraged. For example, information/calculated values that are stored in a relational database are leveraged against information/calculated values stored in an OLAP database. In an embodiment, each node in a processing dimension includes at least one of the following: at least one member from one dimension from OLAP, only one member from a dimension, and multiple dimensions in a node of the processing dimension.

At 310, a simulated spreadsheet that includes calculated information is presented to a user, for example, via presentation component 220. As described above, the simulated spreadsheet is presented in a Web Browser in a visual format common to EXCEL and other spreadsheet software applications (see FIG. 10), and is displayed, for example, via a display device.

FIGS. 6-9 provide exemplary diagrams of information within a relational database for storing and retrieving information. The diagrams shown in FIGS. 6-9 are merely illustrative of exemplary diagrams of information within a relational database that may be used in connection with one or more embodiments of the disclosure, and are not intended to be limiting in any way.

Figure 6:
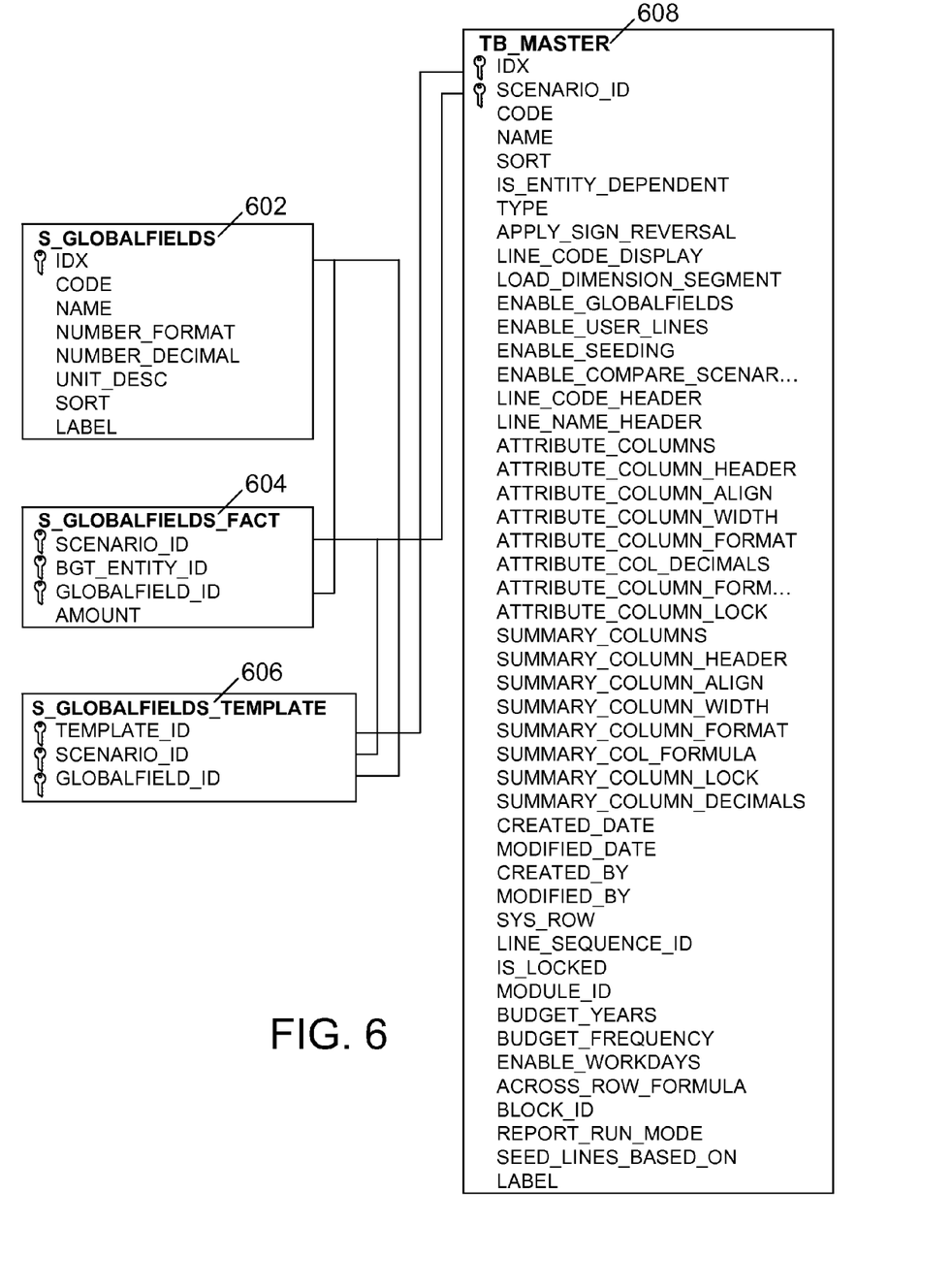
FIG. 6 is an exemplary diagram of a database for storing and retrieving global variables.

FIG. 6 is an exemplary diagram of information within relational database for storing and retrieving global variables. In an embodiment, Table S_GLOBALFIELDS 602 defines administrator defined global variables. These global variables are independent of scenarios and are available to all scenarios. As shown in FIG. 6, Table S_GLOBALFIELDS 602 defines each of the following: global code, global description, global format (e.g., a Percent or Number), number of decimal positions of the global variables, unit description (for information), sort sequence (e.g., for managing the sequence of global variables in the user interface), and a label (e.g., a detailed user description).

In an embodiment, Table S_GLOBALFIELDS_FACT 604 defines values stored for each global variable by scenario. These values are dependent on a simulation "scenario". Table S_GLOBALFIELDS_FACT 604 defines: scenario ID (e.g., a simulation scenario this value is applied to), control dimension ID identifying a budget entity (e.g., one member from each of the control dimensions), global field ID (e.g., defined as the "Global Code" in S_GLOBALFIELDS table 602).

In an embodiment, Table S_GOLBALFIELDS_TEMPLATE 606 defines what model calculations are used in a particular global variable. For example, a template ID defines the model calculations that use this global variable, a scenario ID defines a scenario that uses this global variable, and a globalfield ID defines a global field that is used for this scenario for this model calculation. Table TB_MASTER 608 is defined in FIG. 7. Linkage is shown to describe how global variables are mapped to model calculations.

With reference now to FIG. 7, an exemplary diagram of a database for storing and retrieving model calculations is shown. In an embodiment, Tables TB_MASTER 608 and TB_PARAM 702 define model calculation level configuration options and parameters and Table TB_LINE 704 defines individual lines in a simulated spreadsheet including line types (e.g., Header, Input, Reference, and calculated lines) and line formats.

In an embodiment, Table TB_LINE_PARAM 706 includes additional line level information, for example, attribute values, attribute formulas, subline existence, spread codes, and Table TB_LINE_MAP_CODE 708 includes dimensional mapping information that is configured in a model builder and identifies where to retrieve data from, for example, output database tables, input/output database tables, and/or an OLAP cube.

FIG. 8 is an exemplary diagram of information within a relational database for storing and retrieving input and output model values and user defined calculations for a simulated spreadsheet template, as well as an exemplary diagram of a relational database for storing and retrieving output model values stored in using a multi-dimensional data model. In an embodiment, Table TB_FACT 802 stores all values stored in a model calculation as well as user formulas, for example, input/output values and formulas that are stored to support a model. Therefore, all values and formulas of the model are stored independent of a multi-dimensional model.

In an embodiment, Table FACT_GL 804 stores all output values that are used for reporting and analysis based on a multi-dimensional OLAP model. In embodiments, FACT_GL 804 may support, for example, eleven dimensions. However, different configurations can use different dimensionality while the underlying table FACT_GL 804 does not change. Thus, when forecast values are stored, opening balance, month to date balance, and year to date balance may automatically be calculated and stored in, for example, an OLAP database. In an embodiment, values not provided by a model calculation are calculated using, for example, a prior period balance and current value, and derivation of other totals.

Figure 9:
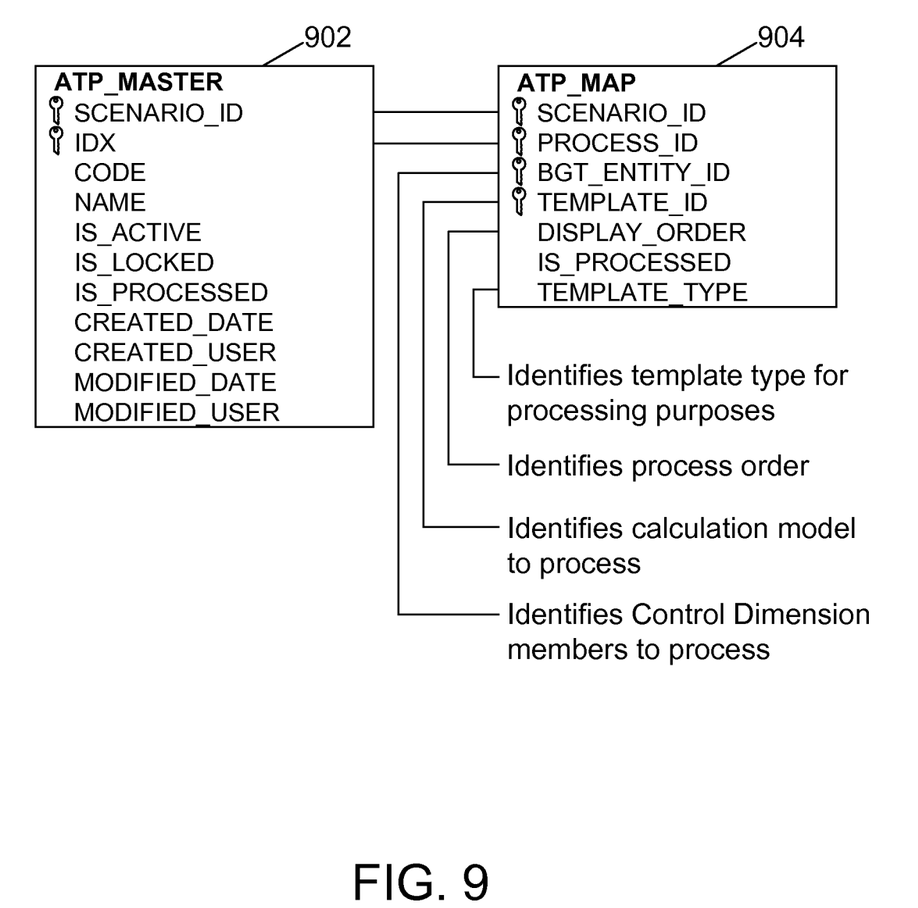
FIG. 9 is an exemplary diagram of a database for configuring a process sequence.

FIG. 9 is an exemplary diagram of information within a relational database for configuring a process sequence that defines tables configured to store simulation processing steps including, for example, a model calculation, a control dimension member, and a processing sequence. In an embodiment, Table ATP_MASTER 902 defines a simulation model stored using a "default" simulation scenario ID, and thereafter, a simulation model can be allocated/assigned to specific simulation scenarios.

In an embodiment, Table ATP_MAP 904 defines a process ID (e.g., table ATP_MASTER 902 record), a process sequence, a process control dimension, and a process model calculation to use therein. In an embodiment, there is a "one to many" relationship between table ATP_MASTER 902 and table ATP_MAP 904. In further embodiments, one master simulation model can have multiple simulation processes consisting of different control dimension members and different calculation models.

Figure 10:
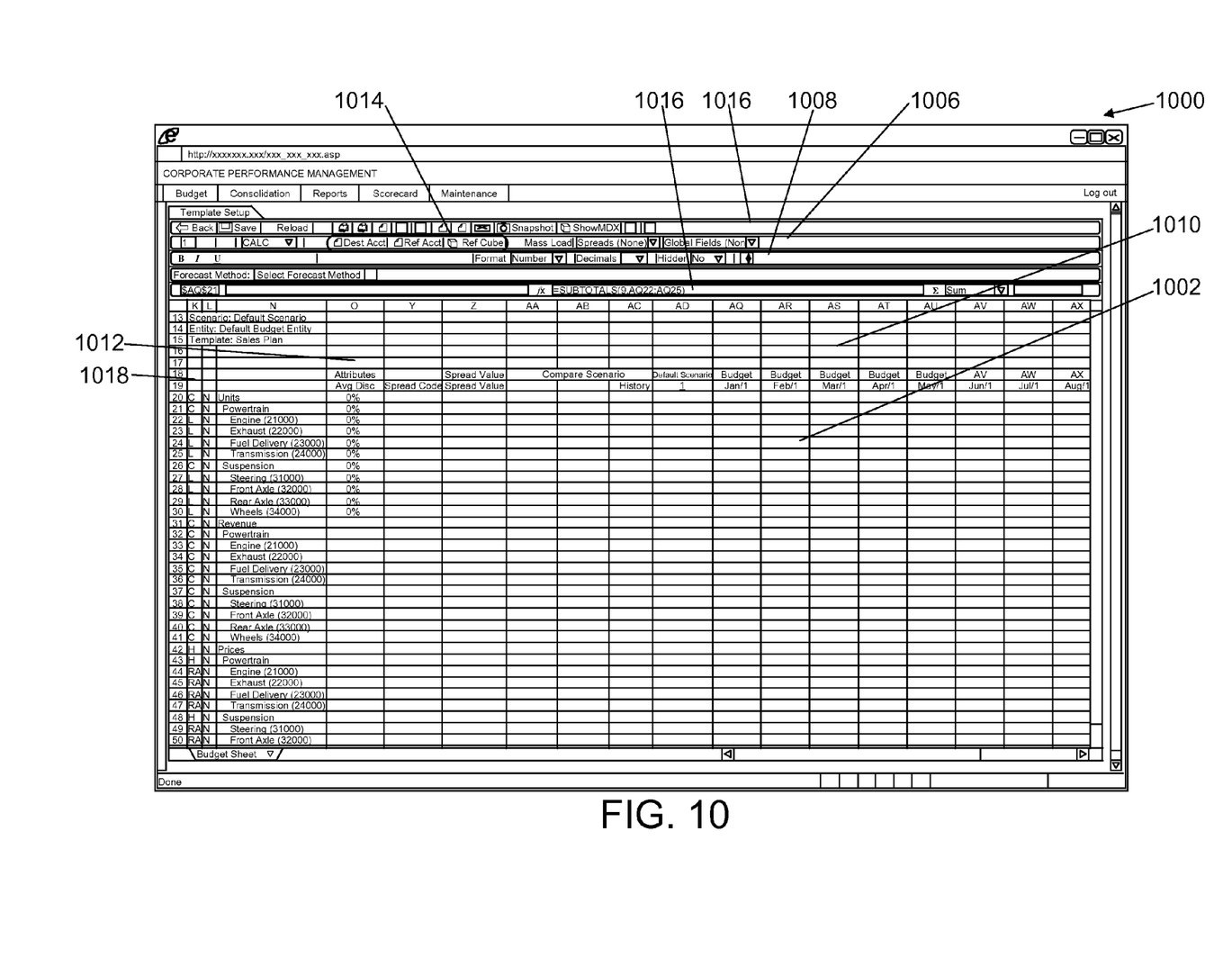
FIG. 10 is an exemplary user interface for creating and presenting a simulated spreadsheet within a Web Browser.

FIG. 10 is an exemplary user interface for creating and presenting a simulated spreadsheet 1000 within a Web Browser. The user interface shown in FIGS. 10 is merely illustrative of an exemplary user interface providing a simulated spreadsheet in a Web Browser that has a visual format common to EXCEL and other spreadsheet software applications that may be used in connection with one or more embodiments of the disclosure, and is not intended to be limiting in any way. In an embodiment, a simulated spreadsheet includes input variables and an input format using a spreadsheet type interface including input cells, header cells, calculated cells, reference cells, and output cells. Reference cells are configured to retrieve information from a relational database and output cells are configured to provide information to the relational database. In an embodiment, the input format includes the ability to format and protect certain cells (e.g., headers, calculations, reference cells) from being changed by a user. Further, "global variables" for identifying, for example, terms, values, and formulas, that affect an entire model calculation may be context sensitive based on a model data set (e.g., a scenario) and model control dimension members. In an embodiment, financial and operational calculations typically found when forecasting future results based on, for example, past history, recipe formulas, business assumptions, units, rates, amounts, and other drivers are defined and stored in a relational database.

With continued reference to FIG. 10, at 1002, discrete model calculations may be defined in terms of spreadsheet formulas and visual metaphor. At 1004, a first row of tools provide model level options including "Save", "Reload", "Export to Excel", "Print", and "Show the conversion of model logic to MDX" (Multi-Dimensional Expression Language). At 1006, a second row of tools illustrate several ways to define row content. Options may include, for example, making a row a retrieval line from a database (L), calculating a line (C), a header line (H) (e.g., for visual formatting), referencing protected values from a relational database (RA), and referencing protected drivers from an OLAP cube (RC). At 1008, a third row defines row formatting. At 1010, columns define time members for writing back data to a relational database and input and output model values.

At 1012, it is shown how attribute columns are used. In this example, there is only one attribute column (and no calculated columns). At 1014, methods of reading/writing data back to the relational database are defined. Each value that is calculated and stored into a relational database is fully described by a dimensional model. In addition, a simulated spreadsheet template configuration defines dimension members sourced from template lines. In an embodiment, a cell in a simulated spreadsheet shown in the user interface that is configured to "write back" (e.g., automatically store) to a relational database fully describes a member from each dimension defined in the relational database. In a further embodiment, dimensions defined in a relational database may be configurable by an administrator and a user interface may be maintained by the model administrator. However, individual users that have access to specific control dimension members may set individual formulas for specific control dimension members that do not apply to other members.

In an embodiment, "Dest Acct" (destination accounts) are accounts that are retrieved from a relational database and used in calculations and written back/stored in the relational database ("Dest Acct" are identified as an "L"), and "Ref Acct" (reference accounts) are values pulled from the relational database and sourced from a fact table, as shown in FIG. 8 (referenced accounts are identified as a "RA"). "Ref Cube" (reference cube) are values retrieved from an OLAP database and are identified with a "RC". In an embodiment, there are separate user interfaces for defining/mapping each of these items.

At 1016, a formula is shown for executing a calculation for "C" lines, illustrating how the system utilizes standard spreadsheet syntax, such as EXCEL syntax. At 1018, row types are identified as defined in 1002-1016 above.

In one aspect, a method is provided for creating a simulated spreadsheet. The method includes receiving information from a simulated spreadsheet template, separating the simulated spreadsheet template from information within the simulated spreadsheet template, storing the simulated spreadsheet template and the corresponding information separately, calculating any calculable information within the information by using spreadsheet formula syntax, and presenting a simulated spreadsheet that includes the calculated information.

In one aspect, the information includes data, formulas, and report formats.

In one aspect, the information is stored in a fact table file format.

In one aspect, a processing sequence of a financial model is received.

In one aspect, calculating the calculable information includes accessing driver values, accessing calculation models, and storing the calculated information.

In one aspect, the simulated spreadsheet template and the corresponding information are stored separately in a relational database.

In one aspect, a processing dimension that is independent of an online analytical process (OLAP) hierarchy is leveraged.

In one aspect, a node in the processing dimension includes at least one member from one dimension from the OLAP.

In one aspect, a node in the processing dimension includes only one member from a dimension.

In one aspect, a node in the processing dimension includes multiple dimensions in a node of the processing dimension.

In another aspect, a system for creating a simulated spreadsheet is provided. The system includes a database, a display device, and a computing device. The computing device includes a processor programmed to receive information from a simulated spreadsheet template, separate the simulated spreadsheet template from information within the simulated spreadsheet template, store the simulated spreadsheet template and the corresponding information separately in the database, calculate any calculable information within the information by using spreadsheet formula syntax, and present a simulated spreadsheet that includes the calculated information to a user via the display device.

In another aspect, the database is a relational database.

In another aspect, the information includes data, formulas, and report formats.

In another aspect, the information is stored in a fact table file format.

In another aspect, the processor is further programmed to leverage a processing dimension that is independent of an online analytical process (OLAP) hierarchy.

In another aspect, a node in the processing dimension includes at least one member from one dimension from the OLAP.

In another aspect, a node in the processing dimension includes only one member from a dimension.

In another aspect, a node in the processing dimension includes multiple dimensions in a node of the processing dimension.

In yet another aspect, one or more computer-readable media having computer-executable components is provided. The components include a receiving component for receiving information from a simulated spreadsheet template, a separating component for separating a simulated spreadsheet from information within the simulated spreadsheet template, a storing component for storing the simulated spreadsheet template and the corresponding information separately in the database, a calculating component for calculating any calculable information within the information by using spreadsheet formula syntax, and a presentation component for presenting a simulated spreadsheet that includes the calculated information to a user via a display device.

In yet another aspect, the received information is stored in a fact table file format.

In yet another aspect, the received information is a selected simulated spreadsheet template a budget entity from a control dimension.

In yet another aspect, the received information is a selected budget entity from a control dimension.

In yet another aspect, the received information is a processing sequence of a financial model.

Exemplary Operating Environment

A computer or computing device such as described herein (e.g., computing device 102) has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules as described above. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for creating a simulated spreadsheet, said method comprising:
    displaying one or more available model spreadsheets in a web browser;
    receiving a selection of one or more of the model spreadsheets via the web browser;
    accessing a plurality of groups of data associated with the one or more model spreadsheets;
    receiving a sequence of processing of the model spreadsheets, the sequence identifying an order the one or more model spreadsheets are to be processed against selected groups of data from the plurality of groups of data;
    organizing the sequence in a hierarchy for processing based on the selected groups of data;
    iteratively performing steps a)-c) on the organized sequence;
        a) obtaining information from the one or more model spreadsheets and the selected groups of data;
        b) calculating any calculable information within the stored obtained information by using spreadsheet formula syntax associated with the one or more model spreadsheets;
        c) storing the obtained information separately from a simulation spreadsheet template comprising the one or more model spreadsheets and the selected groups of data;
    sending a request for a simulated spreadsheet to be rendered in the web browser; and
    presenting a summary of the calculated information in the web browser.

2. The method of claim 1, wherein the obtained information comprises input data, formulas, report formats, and model entity data.

3. The method of claim 2, wherein the simulated spreadsheet template and the obtained information comprising the input data, the formulas, the report formats, and the model entity data are stored separately in a relational database.

4. The method of claim 1, wherein the one or more template selections comprises a plurality of template selections.

5. A system for creating a simulated spreadsheet, the system comprising:
    one or more databases;
    a display device; and
    a server comprising a processor, wherein the processor is programmed to:
        display one or more available model spreadsheets in a web browser;

receive a simulated spreadsheet template, the simulation spreadsheet template comprising one or more selections of model spreadsheets and a sequence identifying an order the one or more selections of the model spreadsheets are to be processed against selected groups of data associated with the one or more selections of the model spreadsheets;

organize the sequence in a hierarchy for processing based on the selected groups of data;

iteratively perform steps a)-c) on the organized sequence;
  a) obtain information from the one or more model spreadsheets and the selected groups of data;
  b) calculate any calculable information within the stored obtained information by using spreadsheet formula syntax associated with the one or more model spreadsheets;
  c) storing the obtained information separately from a simulation spreadsheet template comprising the one or more model spreadsheets and the selected groups of data;

send a request for a simulated spreadsheet to be rendered in a web browser; and present a summary of the calculated information to a user.

6. The system of claim 5, wherein the one or more databases comprises a relational database and an online analytical processor database.

7. The system of claim 5, wherein the processor is further programmed to store the information in the one or more databases in a fact table file format.

8. The system of claim 5 wherein the stored simulation spreadsheet is automatically updated based on the calculated information.

9. The system of claim 5, wherein the one or more databases comprises global variables that are independent of any given simulated spreadsheet template and are available to all simulated spreadsheet templates, and wherein the calculatable information is associated with at least one of the global variables, and wherein calculating any calculatable information within the information by using spreadsheet formula syntax comprises updating the at least one of the global variables based on the calculating, and applying the updated one of the global variables to all applicable simulated spreadsheet templates that include calculable information associated with the updated one of the global variables.

10. One or more non-transitory computer-readable media having computer-executable components, the components comprising:

a displaying component for displaying one or more available model spreadsheets in a web browser;

a receiving component for receiving a selection of one or more of the model spreadsheets and a sequence of processing the model spreadsheets, the sequence identifying an order the one or more model spreadsheets are to be processed against selected groups of data associated with from a plurality of selectable groups of data, an organizing component for organizing the sequence in a hierarchy for processing based on the selected groups of data;

a performing component for iteratively performing steps a)-c) on the organized sequence;
  a) obtain information from the one or more model spreadsheets and the selected groups of data;
  b) calculate any calculable information within the stored obtained information by using spreadsheet formula syntax associated with the one or more model spreadsheets;
  c) storing the obtained information separately from a simulation spreadsheet template comprising the one or more model spreadsheets and the selected groups of data; and a presentation component for receiving instructions to present a simulated spreadsheet in a web browser and presenting simulated spreadsheet that includes the calculated information to a user in the web browser via a display device.

* * * * *